United States Patent [19]
Sugiyama et al.

[11] Patent Number: 5,640,055
[45] Date of Patent: Jun. 17, 1997

[54] MULTIPLEX TRANSMISSION SYSTEM IN A VEHICLE

[75] Inventors: Kazuto Sugiyama; Makoto Uda, both of Shizuoka, Japan

[73] Assignee: Yazaki Corporation, Tokyo, Japan

[21] Appl. No.: 580,186

[22] Filed: Dec. 28, 1995

[30] Foreign Application Priority Data

Dec. 28, 1994 [JP] Japan .................. 6-328121

[51] Int. Cl.$^6$ ................................................. H04J 3/00
[52] U.S. Cl. .......................................... 307/10.1; 370/464
[58] Field of Search ....................... 307/10.1, 10.3, 307/10.6; 370/85.9, 85.1, 85.11; 364/424.01, 424.03–424.05

[56] References Cited

U.S. PATENT DOCUMENTS

| | | | |
|---|---|---|---|
| 4,661,718 | 4/1987 | Matsumoto et al. | 307/10.1 |
| 4,942,571 | 7/1990 | Möller et al. | 370/85.1 |
| 5,483,517 | 1/1996 | Kurata et al. | 307/10.1 |

FOREIGN PATENT DOCUMENTS 5146080  6/1993  Japan .

*Primary Examiner*—Richard T. Elms
*Attorney, Agent, or Firm*—Sughrue, Mion, Zinn, Macpeak & Seas

[57] ABSTRACT

A multiplex transmission system in a vehicle, for transmitting data indicating an on/off state of an ignition switch, includes first and second power distributing units receiving first and second signals over first and second signal lines, respectively, indicating the on/off state of the switch. The first power distributing unit controls a first load in accordance with the on/off state of the switch indicated by the first signal. The first power distributing unit provides a third signal to the second power distributing unit over a multiplex transmission line indicating the on/off state of the switch. When either the second signal or the third signal indicates that the switch is in an on state, the second power distributing unit controls the second load in accordance with the on state of the switch. When the second power distributing unit fails to receive the third signal, the second power distributing unit controls the second load in accordance with the on/off state indicated by the second signal.

12 Claims, 6 Drawing Sheets

MULTIPLEX TRANSMISSION SYSTEM IN A VEHICLE

BACKGROUND OF THE INVENTION

1. Field of the Invention

This invention relates to multiplex transmission systems in vehicles, and more particularly to a multiplex transmission system in a vehicle which transmits data on the opening and closing of an ignition switch through a plurality of circuits.

2. Related Art

An example of a conventional multiplex transmission system in a vehicle is a power distributing system in a vehicle which has been disclosed, for instance, by Japanese Patent Application (OPI) No. 146080/1993 (the term "OPI" as used herein means an "unexamined publication application").

The power distributing system will be described with reference to FIG. 7. A vehicle 50 is divided into three parts: an engine room 51, a cowl 52, and a rear room 53. In the engine room 51, two parts, namely, a power source 54, and a distributing unit 56 are provided, the distributing unit 56 being connected through a power line 55 to the power source 54. In the cowl 52, a distributing unit 59 is provided which is connected through a power line 58 to the distributing unit 56 in the engine room, and in addition a meter 60 and a switch 61 are provided which are connected to the distributing unit 59. In the rear room 53, a distributing unit 62 is provided which is connected through a power line 57 to the distributing unit 56. A common multiplex transmission line 63 is connected to those distributing units 56, 59 and 62. The distributing units 56, 59 and 62 control the outputs of loads (not shown) which are connected thereto.

The system operates as follows: When turned on, the switch 61 provides an "on" signal. The "on" signal is applied to the distributing unit 59, where it is converted into a multiplex transmission signal. This signal is transmitted through the multiplex transmission line 63 to the other distributing units 56 and 62, so that those distributing units 56 and 62 detect the fact that the switch 61 has been turned on, and do necessary actions.

However, the above-described conventional system is disadvantageous in the following points: That is, when the distributing unit 59 is out of order, then the "on" signal of the switch 61 is not transmitted to the other distributing units 56 and 62. As a result, not only is the load connected to the distributing unit 59 disabled, but also the loads connected to the distributing units 56 and 62 are disabled. Hence, the functions of the vehicle are all lowered at the same time.

SUMMARY OF THE INVENTION

Accordingly, an object of the invention is to eliminate the above-described difficulties accompanying a conventional multiplex transmission system. More specifically, an object of the invention is to provide a multiplex transmission system for a vehicle that has a back-up function so that, even when the multiplex transmission line is out of order or abnormal in operation, the vehicle is prevented from being greatly reduced in function.

The foregoing object of the invention has been achieved by the provision of the following means:

The first means is a multiplex transmission system in a vehicle in which a plurality of power distributing units are connected to a multiplex transmission line; in which, according to the invention, signals lines of an ignition switch are connected to the plurality of power distributing units.

The second means is a multiplex transmission system in a vehicle in which the inside of the vehicle is divided into a plurality of regions, at least one power distributing unit, to which loads are connected, is provided in each of the regions, the power distributing units are connected to one another through a multiplex transmission line for transmission of data between the power distributing units, and data on the opening and closing of an ignition switch connected to one of the power distributing units is transmitted through the multiplex transmission line to the other power distributing units, in which, according to the invention, a signal line whose value depends on the opening and closing of the ignition switch, is connected to the power distributing unit, and an input circuit for detecting the value of the signal line is provided in each of the power distributing units.

In the system, the agreement of data obtained through the multiplex transmission line with data obtained through the signal line is utilized for determination of whether the ignition switch is opened or whether the ignition switch is closed.

In the system of the invention, the multiplex transmission line and the signal lines are connected to the plurality of power distributing units. Hence, the data on the opening and closing operations of the ignition switch is transmitted between the power distributing units through two circuits of the multiplex transmission line and the signal line, thus backing up the system. This feature eliminates the difficulty that all or almost all of the loads in the vehicle are stopped at the same time.

In addition, in the system of the invention, the agreement of data obtained through the multiplex transmission line with data obtained through the signal line is utilized for determination of whether the ignition switch is opened or whether it is closed. Thus, the operation of the system is greatly improved in reliability.

DETAILED DESCRIPTION OF THE DRAWINGS

A multiplex transmission system in a vehicle, which constitutes an embodiment of the invention, will be described with reference to the accompanying drawings.

First, the arrangement of the multiplex transmission system of the invention will be described with reference to FIGS. 1 and 2.

Figure 1:
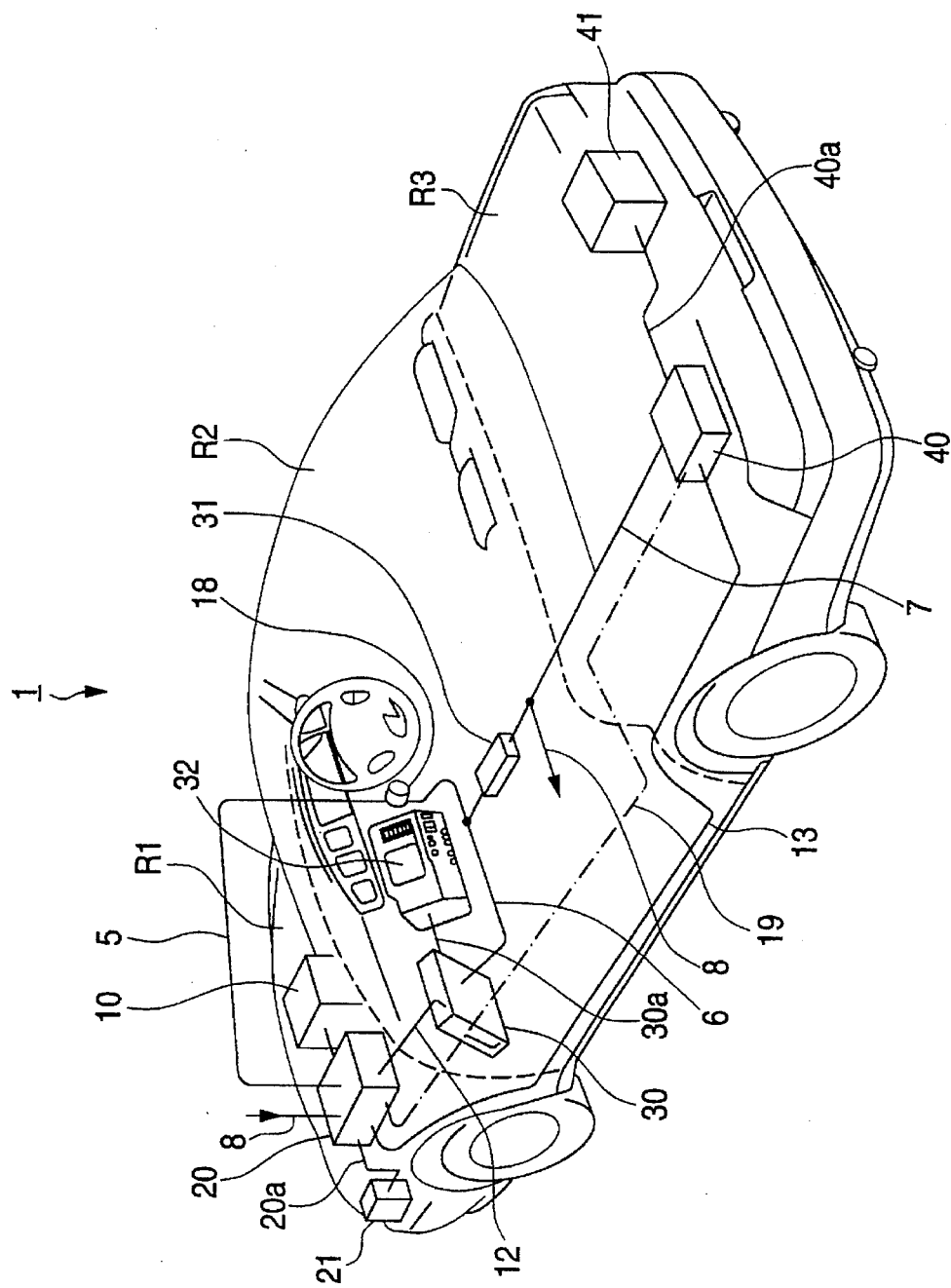
FIG. 1 is a perspective view showing the arrangement of a multiplex transmission system in a vehicle, which constitutes an embodiment of the invention.

FIG. 1 is a perspective view showing the arrangement of the multiplex transmission system of the invention. FIG. 2 is a block diagram for a description of the arrangement of the multiplex transmission system shown in FIG. 1.

Figure 2:
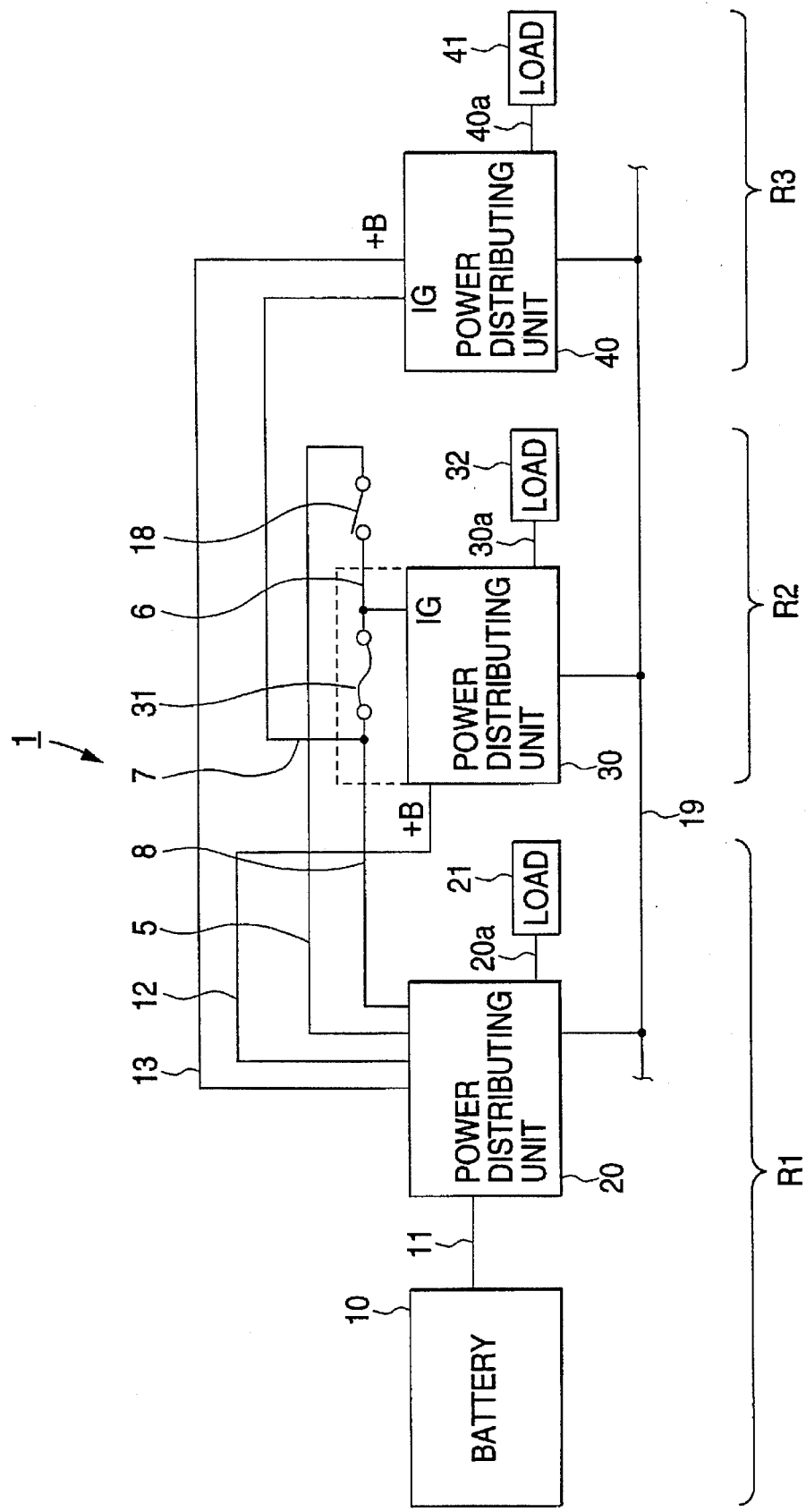
FIG. 2 is a block diagram showing the multiplex transmission system shown in FIG. 1.

In FIGS. 1 and 2, the multiplex transmission system of the invention is generally indicated at 1. The system 1 is applied to a vehicle, the inside of which is divided into three parts, namely, a first region (or engine room) R1, a second region (or cowl) R2, and a third region (or rear room) R3.

The multiplex transmission system 1 comprises: a battery (or power source) 10; power lines 11, 12 and 13; power distributing units 20, 30 and 40; loads 21, 32 and 41; a multiplex transmission line 19; an ignition switch 18; signal lines 5, 6, 7 and 8; and a protective circuit 31.

In FIG. 1, the protective circuit 31 is shown separate from the power distributing unit 20; however, the invention is not limited thereto or thereby. That is, generally the protective circuit 31 is built in the power distributing unit 30 as shown in FIG. 2, or it is connected directly to the power distributing unit 20.

The battery 10, the power distributing unit 20, and the load 21 are arranged in the first region R1; and the power line 12, the power distributing unit 30, the load 32, the ignition switch 18, and the protective circuit 31 are arranged in the second region R2; and the power distributing unit 40, and the load 41 are arranged in the third region R3.

The battery 10 is connected through the power line 11 to the power distributing unit 20; and the power distributing unit 20 is connected through the power line 12 to the power distributing unit 30 and through the power line 13 to the power distributing unit 40. The multiplex transmission line 19 is connected to all of the power distributing units 20, 30 and 40, so that the data are transmitted between those power distributing units 20, 30 and 40 through the multiplex transmission line 19.

The load 21 is connected through a drive line 20a to the power distributing unit 20; the load 32 is connected the load 41 is connected through a drive line 40a to the power through a drive line 30a to the power distributing unit 30; and the load 41 is connected through a drive line 40a to the power distributing unit 40.

The signal line 5 is high in potential, being connected to an ignition circuit (not shown). The signal line 5 is extended from the power distributing unit 20, and connected to one terminal of the ignition switch 18. The other terminal of the ignition switch 18 is connected to the signal line 6, which is connected to a terminal IG of the power distributing unit 30 and to one of the terminals of the protective circuit 31. The other terminal of the latter 31 is connected to one end of the signal line 7 and to one end of the signal line 8. The other end of the signal line 7 is connected to a terminal IG of the power distributing unit 40. The other end of the signal line 8 is connected through the power distributing unit 20 to the ignition circuit.

The signal lines 6 through 8 are so connected that the potential of those signal lines 6 through 8 depends on the on-off operation (opening and closing) of the ignition switch 18. That is, when the ignition switch 18 is opened, the potential of the signal lines 6 through 8 is low; and when the ignition switch 18 is closed, it is high.

Figure 3:
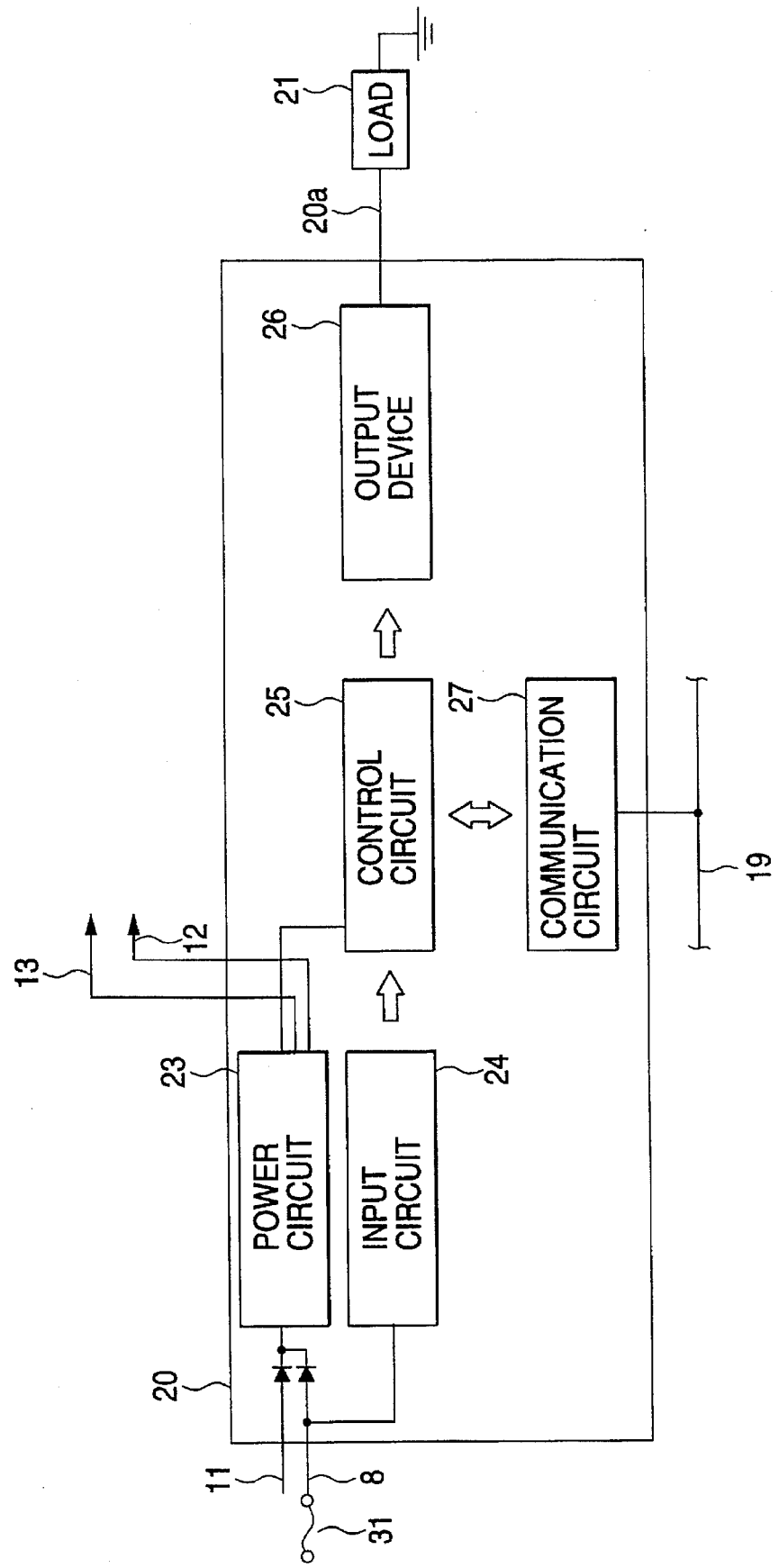
FIG. 3 is a block diagram showing a power distributing unit in a first region shown in FIG. 1.

The power distributing unit 20, as shown in FIG. 3, comprises: a power circuit 23 which receives power through the power line 11 and distributes it to various sections in the unit 20 and applies it to the power lines 12 and 13; an input circuit 24 which receives signals representing the states of the ignition switch 18; a control circuit 25 which is connected to the power circuit 23 and the input circuit 24, and controls the operations of an output device 26 (described later) and a communication circuit 27 (described later); the aforementioned output device 26 which applies an output signal 20a to the load 21 according to an instruction from the control circuit 25; and the aforementioned communication circuit 27 which, according to an instruction from the control circuit 25, receives data from the multiplex transmission line 19 and applies it to the control circuit 25.

Figure 5:
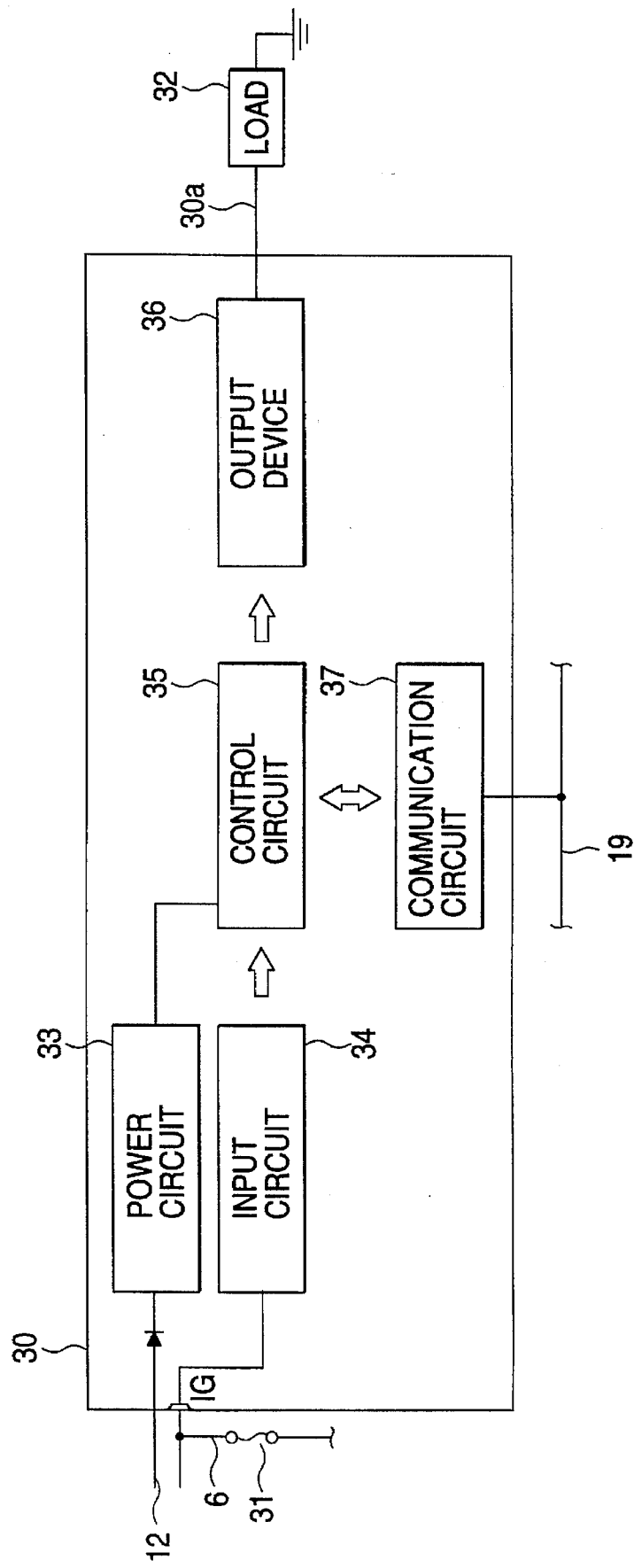
FIG. 5 is a block diagram showing a power distributing unit in a second region shown in FIG. 1.

The power distributing unit 30, as shown in FIG. 5, comprises: a power circuit 33 which receives power through the power line 12 and distributes it to various sections in the unit 30; an input circuit 34 which receives through the terminal IG the signals representing the states of the ignition switch 18; a control circuit 35 which are connected to the power circuit 33 and the input circuit 34 and controls the operation of an output device 36 (described later) and communication circuit 37 (described later); the aforementioned output device 36 which applies an output signal 30a to the load 32 according to an instruction from the control circuit 35; and the aforementioned communication circuit 37 which, according to an instruction from the control circuit 35, applies ignition data to the multiplex transmission line 19 or receives data from the multiplex transmission lines 19 and applies it to the control circuit 35.

Figure 4:
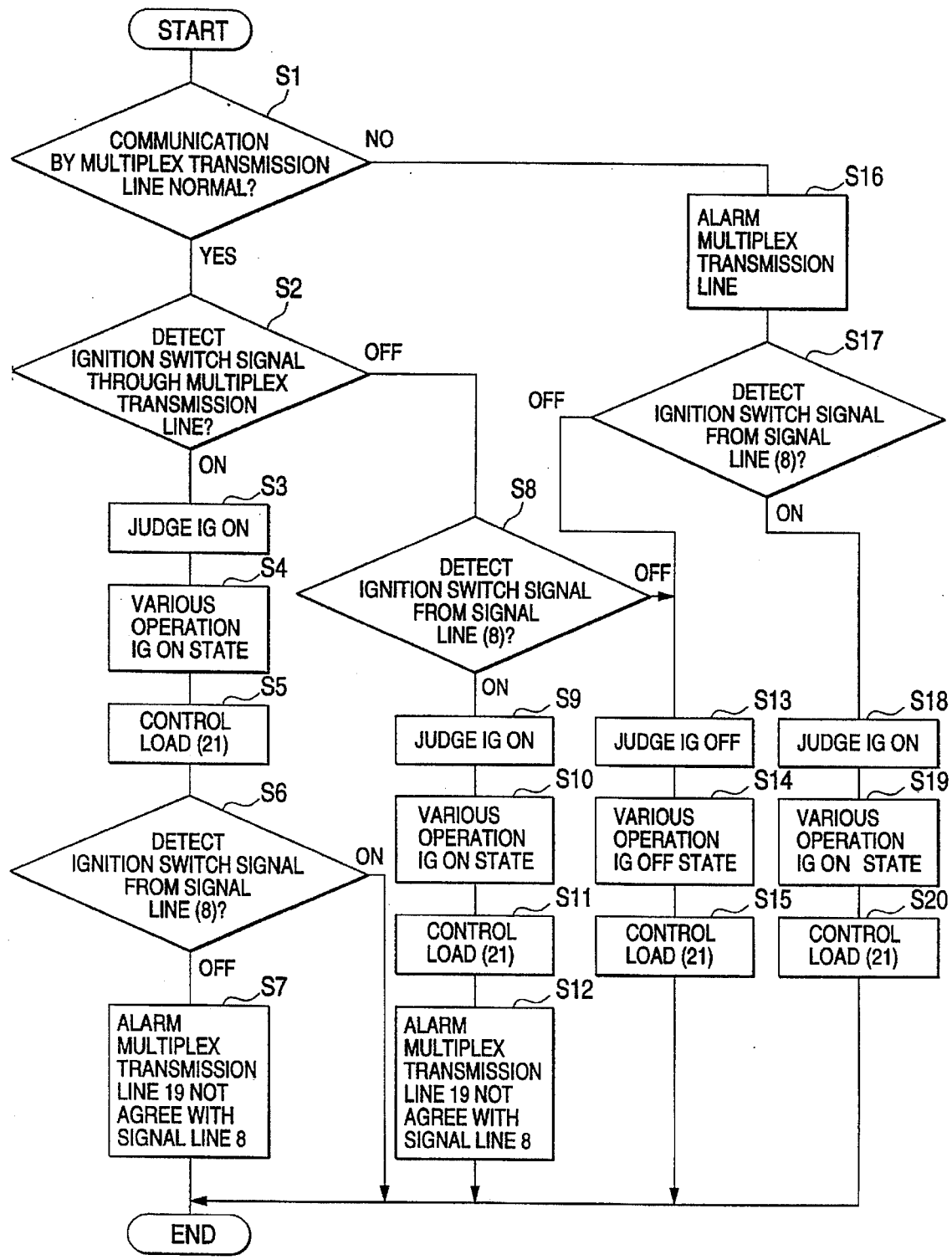
FIG. 4 is a flow chart for a description of the operation of the power distributing unit shown in FIG. 3.
Figure 6:
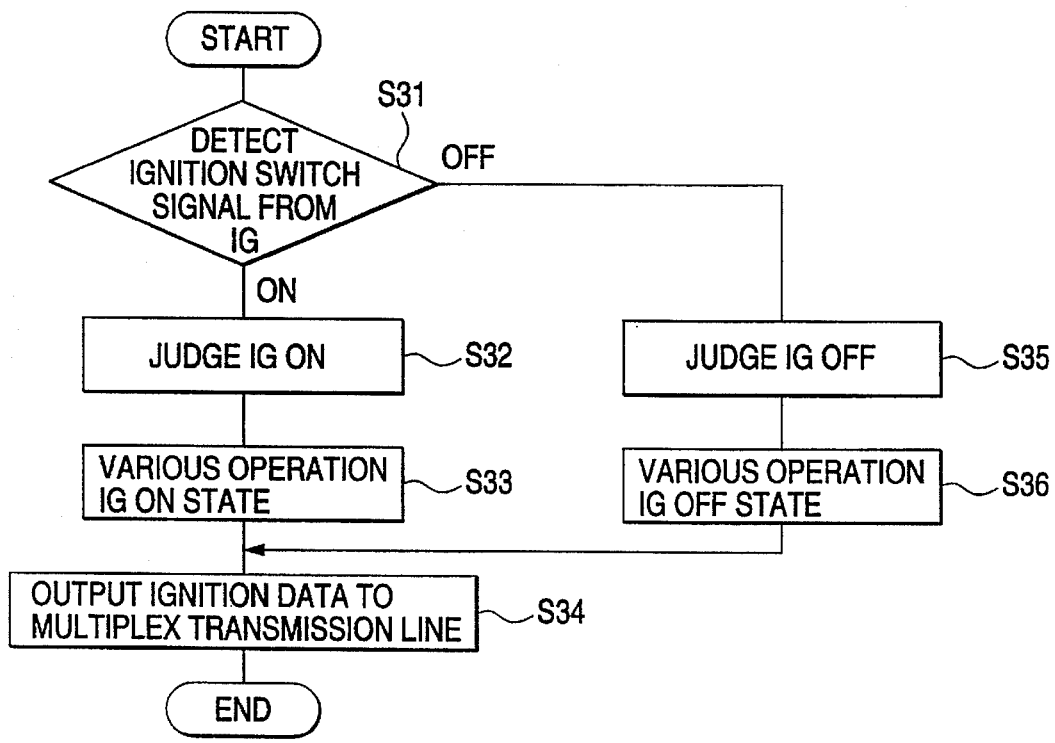
FIG. 6 is a flow chart for a description of the operation of the power distributing unit shown in FIG. 5.
Figure 7:
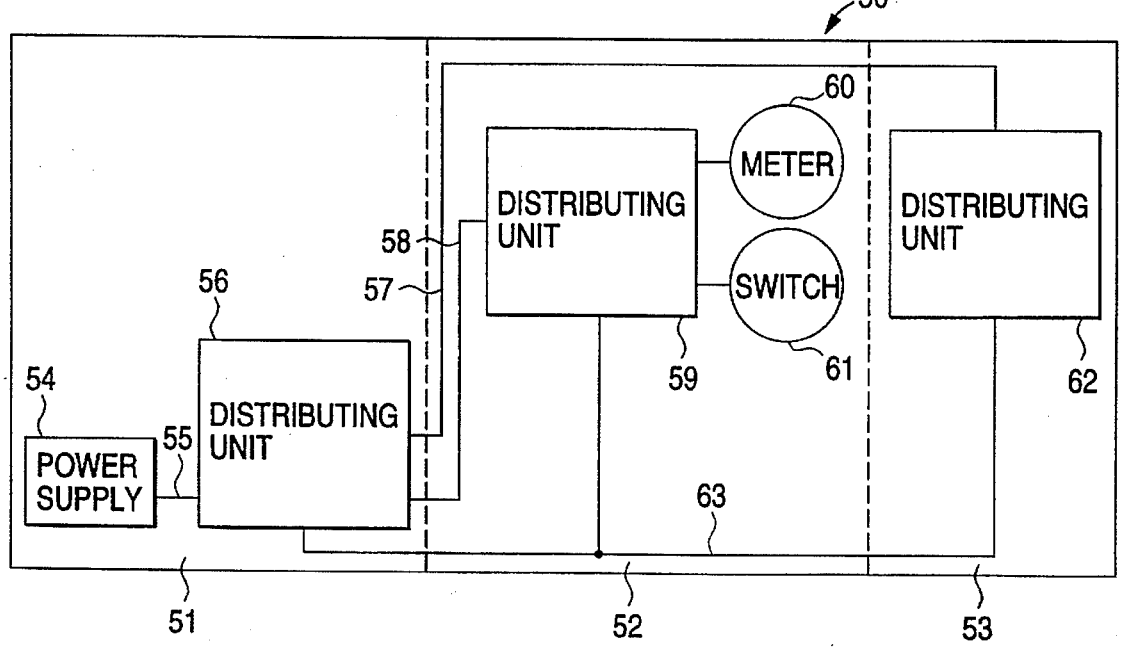
FIG. 7 is a block diagram showing the arrangement of a conventional multiplex transmission system in a vehicle.

FIG. 4 is a flow chart for a description of the operation of the power distributing unit 20 shown in FIG. 3. FIG. 6 is also a flow chart for a description of the operation of the power distributing unit 30 shown in FIG. 5.

The operation of the multiplex transmission system according to the invention will be described with reference to FIGS. 4 and 6.

When the ignition switch 18 in the second region R2 (the cowl) is in "off" state, data on the "off" state is outputted, so that the signal line 8 is low in potential. Hence, the data on the "off" state is applied through the multiplex transmission line 19 to the power distributing unit 20 which is provided in the first region R1 the engine room) (cf. FIG. 2), and the low potential of the signal line 8 is applied, as an "off" signal, thereto. When the ignition switch is in "on" state, data on the "on" state is applied to the multiplex transmission line 19, and the signal line 8 is made high in potential. Hence, the data on the "on" state is applied through the multiplex transmission line 19 to the power distributing unit 20, and the high potential of the signal line 8 is applied, as an "on" signal, thereto.

First, in the power distributing unit 20 arranged in the first region R1 (the engine room), according to the communication data which the communication circuit 27 receives from the multiplex transmission line 19, the control circuit 25 detects whether or not the state of communication by the multiplex transmission line (Step S1) is normal. When the state of communication by the multiplex transmission line is normal, then the ignition switch signal inputted through the multiplex transmission line is detected (Step S2). Where the ignition switch signal corresponds to the "on" state of the ignition switch, then it is determined that the ignition switch is in "on" state (Step S3). In response to this determination, the control 25 performs a various operations which are to be done when the ignition switch is turned on (Step S4). The output device 26 applies the output signal 20a to the load 21, to control the load 21 (Step S5).

Next, the control circuit 25 receives the ignition switch signal through the input circuit 24 from the signal line 8 and subjects it to decision (Step S6). In the case where it is in "on" state, it is determined that it is normal. On the other hand, in the case where it is in "off" state, the fact is alarmed and displayed that the communication data obtained through the multiplex transmission line 19 does not agree with the signal from the signal line 8 (Step S7).

In the case where, in Step S2, the ignition switch signal received through the multiplex transmission line 19 corresponds to the "off" state of the ignition switch, decision is performing according to the ignition switch signal from the signal line 8 (Step S8). When it is in "on" state, the it is determined that the ignition switch is in "on" state (Step S9).

In response to this determination, the control 25 performs a variety of operations which are to be done when the ignition switch is turned on (Step S10). The output device 26 applies the output signal 20a to the load 21, to control the latter 21 (Step S11). Thereafter, the control 25 performs a variety of operations which are to be done when the ignition switch is turned on (Step S4). The output device 26 applies the output signal 20a to the load 21, to control the latter 21 (Step S12).

On the other hand, in the case where in Step S8 the ignition switch signal from the signal line 8 is in "off" state, it is determined that the ignition switch is in "off" state (Step S13). In response to this determination, the control circuit 25 performs a variety of operations which are to be done when the ignition switch is turned off (Step S14). And the output device 26 applies the output signal 20a to the load 21, to control the latter 21 (Step S15).

In the case where in the aforementioned Step S1, the communication through the multiplex transmission line 19 is abnormal, then the abnormality is alarmed by use of the multiplex transmission line 19 (Step S16), and decision are carried out according to the ignition switch signal from the signal line 8 (Step S17). If it is in the "on" state, then it is determined that the ignition switch is in "on" state (Step S18). In response to the determination, the control circuit 25 performs various operations which are to be done when the ignition switch is turned on (step S19). And the output device 26 applies the output signal 20a to the load 21, to control the latter 21 (Step S20).

In the case where the ignition switch signal from the signal line 8 is in "off" state, then Step S13 is effected again, and accordingly the Steps following Step S13 are also effected.

As was described above, with the aid of the operations in Steps S2 through S6, it is determined whether or not the data provided through the multiplex transmission line agrees with the signal input from the signal line. Hence, the multiplex transmission system of the invention is greatly improved in operational reliability when compared with the conventional one.

In addition, even if an abnormal condition occurs with the multiplex transmission line 19—for instance the multiplex transmission line 19 is broken, the above-described Step 8 and the steps following Step 8 or the above-described Step 17 and the following Steps are effected so as to back up the system according to the signal input from the signal line; that is, all the loads 21 in the region are not stopped.

On the other hand, when the ignition switch 18 arranged in the second region R2 is in "off" state, the high potential of the signal line 5 is not applied to the terminal IG of the power distributing unit 30 arranged in the second region R2, and instead the low potential of the signal line 8 is applied, as an "off" signal, to the terminal IG through the protective circuit 31 and the signal line 6. Hence, as shown in FIG. 6, when the input circuit 34 of the power distributing unit 30 receives the "off" signal through the terminal IG (Step S31), it is determined that the ignition switch is in "off" state (Step S35), and various operations are carried out which are to be done when the ignition switch is in "off" state (Step S36). That is, the output device 36 applies an output signal 30a to the load 32 to drive the latter 32. Next, the communication circuit 37 applies the ignition data (for instance "0") to the multiplex transmission line 19 which indicates the fact that the ignition switch 18 is in "off" state (Step 34). The ignition data applied to the multiplex transmission line 19 is detected by the communication circuit in the power distributing unit 20 (or 40) in the region R1 (or R3).

When, on the other hand, the ignition switch 18 is turned on, the high potential of the signal line 5 is applied, as an "on" signal, to the terminal IG of the power distributing unit 30 through the signal line 6. When the input circuit 34 of the power distributing unit 30 receives the "on" signal of the ignition switch through the terminal IG ( Step S31), it is determined that the ignition switch is in "on" state (Step S32). In response to this determination, the control circuit 35 performs various operations which are to be done when the ignition switch is turned on (Step S33). That is, the output device 36 applies an output signal 30a to the load 32, to drive the latter 32. Next, the communication circuit 37 applies the ignition data (for instance "1") to the multiplex transmission line 19 which indicates the fact that the ignition switch 18 is in "on" state. The ignition data applied to the multiplex transmission line 19 is detected by the communication circuit in the power distributing unit 20 (or 40) in the region R1 (or R3).

As was described above, with the multiplex transmission system, the power distributing unit 30 is operable according to the signal from the signal line. Hence, even if abnormal condition occurs with the multiplex transmission line 19—for instance the latter 19 is broken, the load 32 in the region will never be stopped.

Similarly as in the above-described case, the power distributing unit 40 is also operable according to the signal input from signal line 7. Hence, even when the multiplex transmission line 19 becomes out of order—for instance the latter 19 is broken, the load 41 in the region will never be stopped.

The power distributing unit 30 performs the operations shown in the flow chart of FIG. 6 repeatedly at predetermined intervals. Hence, in the case where the power distributing unit 30 operates correctly, the ignition data (for instance "0" or "1") is applied to the multiplex transmission line 19 periodically. Hence, it can be determined whether or not the operation of the power distributing unit 30 is normal, by causing the remaining power distributing units or a circuit monitoring unit (not shown) to watch the provision of the ignition data by the power distributing unit 30. In other words, when the ignition data is not periodically outputted for instance because the communication circuit 37 or the control circuit 35 is out of order, then the other power distributing units or the circuit monitoring unit detects the trouble; that is, the failure of the power distributing circuit 30 can be detected. Hence, the above-described arrangement is considerably more effective in the maintenance of the unit.

In the case where the system is so designed that a plurality of power distributing units applies ignition data to the multiplex transmission line 19, the busy line can be eliminated by employing a technique (for instance token-pass) known in "LAN" or the like.

In the above-described system, the signal line 5 at high potential is connected to the ignition switch 18, while the signal line at low potential is connected through the protective circuit 31 and the signal line 6 to the ignition switch 18 and the terminal IG of the power distributing unit 31. Hence, when, with the ignition switch 18 is turned on, for instance a circuit downstream of it is short-circuit so that the protective circuit 31 is blown or the signal line 7 or 8 is broken, the ignition switch signal from the signal line 6 is applied to the power distributing unit 30. Therefore, the power distributing circuit 30 is able to apply the ignition data through the multiplex transmission line 19 to the other power distributing units 20 and 40. Hence, as shown in Step S6 and Step S7 in FIG. 4, the fact is alarmed and displayed that the communication data provided through the multiplex transmission line 19 is not agreeable with the signal from the signal line 8.

When, in the above-described system, with the ignition switch 18 turned off, the protective circuit 31 is opened (blown) or becomes insufficient in contact, or the signal line 8 is broken, the impedance of the signal line 6 becomes infinitely great. Hence, by forming the input circuit 34 with a tri-state element, and by modifying the control circuit 35 so that it is able to detect the impedance of the input circuit, the aforementioned trouble can be detected that the protective circuit is opened (blown) or becomes insufficient in contact, or the signal line 8 is broken.

As was described above, in the system of the invention, not only the multiplex transmission line is connected to the plurality of power distributing units, but also the signal lines of the ignition circuit are connected to the power distributing units. Hence, even when abnormal conditions occur with the multiplex transmission line—for instance the latter is broken or becomes out of order, the back-up function is carried according to the signal provided through the signal line. This feature eliminates the difficulty that all or almost all of the loads in the vehicle are stopped.

In addition, in the system of the invention, it is detect whether or not the data obtained through the multiplex transmission line agrees with the signal input obtained through the signal line for determination of whether the ignition switch is opened or whether the ignition switch is closed. Thus, the operation of the system is greatly improved in reliability.

Hence, even when the communication system becomes out of order or abnormal in operating condition, the vehicle will never be greatly reduced in function, which ensures the safe traveling of the vehicle. This effect should be highly appreciated.

What is claimed is:

1. A multiplex transmission system for transmitting data indicating an on/off state of a switch, comprising:

a first power distributing unit connected to a first load;

a second power distributing unit connected to a second load;

a first signal line connected between the switch and said first power distributing unit, said first signal line providing a first signal indicating the on/off state of the switch, said first power distributing unit controlling the first load in accordance with the on/off state of the switch indicated by the first signal;

a second signal line connected between the switch and said second power distributing unit, said second signal line providing a second signal indicating the on/off state of the switch; and a multiplex transmission line connected between said first and second power distributing units, said first power distributing unit providing a third signal to said second power distributing unit over said multiplex transmission line, indicating the on/off state of the switch, wherein, when either the second signal or the third signal indicates that the switch is in an on state, said second power distributing unit determines that the switch is in the on state and controls the second load in accordance with the on state of the switch, and when said second power distributing unit fails to receive the third signal, said second power distributing unit controls the second load in accordance with the on/off state indicated by the second signal.

2. The multiplex transmission system according to claim 1, wherein, when the third signal indicates that the switch is in an off state, said second power distributing unit controls the second load in accordance with the on/off state of the switch indicated by the second signal.

3. The multiplex transmission system according to claim 1, further comprising:

a third power distribution system connected to a third load and to said multiplex transmission line; and a third signal line connected between the switch and said third power distributing unit, said third signal line providing a fourth signal indicating the on/off state of the switch, wherein, said first power distributing unit provides the third signal to said third power distributing unit over said multiplex transmission line, wherein, when either the third signal or the fourth signal indicates that the switch is in an on state, said third power distributing unit controls the third load in accordance with the on state of the switch, and when said third power distributing unit fails to receive the third signal, said third power distributing unit controls the third load in accordance with the on/off state indicated by the fourth signal.

4. The multiplex transmission system according to claim 1, wherein the system is onboard a vehicle divided into at least a first region and a second region, said first power distribution unit and the switch being located in the first region and said second power distribution unit being located in the second region.

5. The multiplex transmission system according to claim 4, wherein the switch is an ignition switch of the vehicle.

6. The multiplex transmission system according to claim 1, further comprising a protective circuit disposed between the switch and said second signal line, said second power distribution unit controlling the second load in accordance with the on/off state of the switch indicated by the third signal when said protective circuit disconnects said second signal line from the switch.

7. A method of transmitting data indicating an on/off state of a switch in a multiplex transmission system, comprising the steps of:

providing a first signal on a first signal line to a first power distributing unit indicating the on/off state of the switch;

controlling a first load with said first power distributing unit in accordance with the on/off state of the switch indicated by the first signal;

providing a second signal on a second signal line to a second power distributing unit indicating the on/off state of the switch;

providing a third signal from said first power distributing unit to said second power distributing unit over a multiplex transmission line, indicating the on/off state of the switch;

when either the second signal or the third signal indicates that the switch is in an on state, controlling a second load with said second power distributing unit in accordance with the on state of the switch; and when said second power distributing unit fails to receive the third signal, controlling the second load with said second power distributing unit in accordance with the on/off state indicated by the second signal.

8. The method according to claim 7, further comprising the step of:

when the third signal indicates that the switch is in an off state, controlling the second load with said second power distributing unit in accordance with the on/off state of the switch indicated by the second signal.

9. The method according to claim 7, further comprising the steps of:

providing a fourth signal on a third signal line to a third power distributing unit indicating the on/off state of the switch;

providing the third signal from said first power distributing unit to said third power distributing unit over the multiplex transmission line, indicating the on/off state of the switch;

when either the fourth signal or the third signal indicates that the switch is in an on state, controlling a third load with said third power distributing unit in accordance with the on state of the switch; and when said third power distributing unit fails to receive the third signal, controlling the third load with said third power distributing unit in accordance with the on/off state indicated by the fourth signal.

10. The method according to claim 7, wherein the multiplex transmission system is onboard a vehicle divided into at least a first region and a second region, the method further comprising the steps of:

locating said first power distribution unit and said switch in the first region; and locating said second power distribution unit in the second region.

11. The method according to claim 10, wherein the switch is an ignition switch of the vehicle.

12. The method according to claim 7, further comprising the step of:

controlling the second load with said second power distributing unit in accordance with the on/off state of the switch indicated by the third signal when a protective circuit disposed between the switch and said second signal line disconnects the second signal line from the switch.

* * * * *